US010611662B2

(12) United States Patent
Buellesfeld et al.

(10) Patent No.: US 10,611,662 B2

(45) Date of Patent: Apr. 7, 2020

(54) METHOD FOR THE PRODUCTION OF GLASS COMPONENTS

(71) Applicant: SCHOTT AG, Mainz (DE)

(72) Inventors: Frank Buellesfeld, Kriftel (DE); Ulrich Lange, Mainz (DE); Ralf Biertuempfel, Mainz-Kastel (DE); Lisa Pudlo, Oberdiebach (DE); Helge Jung, Nierstein (DE)

(73) Assignee: SCHOTT AG, Mainz (DE)

( * ) Notice: Subject to any disclaimer, the term of this patent is extended or adjusted under 35 U.S.C. 154(b) by 71 days.

(21) Appl. No.: 15/585,360

(22) Filed: May 3, 2017

(65) Prior Publication Data

US 2017/0233280 A1 Aug. 17, 2017

Related U.S. Application Data

(63) Continuation of application No. 14/675,301, filed on Mar. 31, 2015, now Pat. No. 9,682,883, which is a (Continued)

(30) Foreign Application Priority Data

Apr. 30, 2013 (DE) ........................ 10 2013 104 409
Jan. 23, 2014 (DE) ........................ 10 2014 100 750

(51) Int. Cl.
*C03B 23/037* (2006.01)

(52) U.S. Cl.
CPC ..... *C03B 23/037* (2013.01); *Y10T 428/24355* (2015.01)

(58) Field of Classification Search
None
See application file for complete search history.

(56) References Cited

U.S. PATENT DOCUMENTS 3,107,196 A 10/1963 Acloque
3,635,687 A 1/1972 Dunlap et al.
(Continued)

FOREIGN PATENT DOCUMENTS

CN 1230394 C 12/2005
CN 101031516 9/2007
(Continued)

OTHER PUBLICATIONS

Yumi Katasho et al., "Behaviors of Si, B, Al, and Na during Electrochemical Reduction of Borosilicate Glass in Molten CaCl2", Journal of the Electrochemical Society, 164 (7) D478-D485 (2017) (Year: 2017).*

(Continued)

*Primary Examiner* — Cynthia Szewczyk

(74) *Attorney, Agent, or Firm* — Ohlandt, Greeley, Ruggiero & Perle, L.L.P.

(57) ABSTRACT

A method for the production of glass components, an apparatus for carrying out the method, and a glass component that is obtainable through the method are provided. The method is a drawing method wherein a forming zone of a preform is heated to a temperature that allows drawing of the glass. The method includes a forming zone of the preform that is very small. Thereby the width of the preform is decreased to a smaller extent than its thickness. The glass components that can be obtained by this method have very smooth surfaces.

11 Claims, 6 Drawing Sheets

Related U.S. Application Data continuation-in-part of application No. 14/265,765, filed on Apr. 30, 2014, now abandoned.

(56) References Cited

U.S. PATENT DOCUMENTS

| | | | |
|---|---|---|---|
| 4,175,942 | A | 11/1979 | Lipp |
| 4,354,866 | A | 10/1982 | Mouly |
| 4,869,315 | A | 9/1989 | Mevenkamp |
| 5,248,483 | A | 9/1993 | Carter |
| 6,167,727 | B1 | 1/2001 | Tajima et al. |
| 6,715,317 | B1 | 4/2004 | Brauer et al. |
| 6,938,442 | B1 | 9/2005 | Schmitt et al. |
| 7,231,786 | B2 | 6/2007 | Cimo et al. |
| 7,306,684 | B2 | 12/2007 | Takayama et al. |
| 2005/0031831 | A1 | 2/2005 | Buellesfeld et al. |
| 2006/0559950 | | 3/2006 | Buellesfeld et al. |
| 2006/0112728 | A1 | 6/2006 | Nakagawa |
| 2006/0252628 | A1 | 11/2006 | Ichimura |
| 2007/0178281 | A1 | 8/2007 | Nakamura et al. |
| 2007/0271957 | A1 | 11/2007 | Toshihiro et al. |
| 2008/0216515 | A1 | 9/2008 | Tetsuya et al. |
| 2009/0314032 | A1 | 12/2009 | Tomamoto et al. |
| 2010/0196234 | A1 | 8/2010 | Hammer et al. |
| 2011/0314870 | A1 | 12/2011 | Fredholm |
| 2012/0048905 | A1 | 3/2012 | Kudva et al. |
| 2014/0342120 | A1 | 11/2014 | Buellesfeld et al. |
| 2015/0274573 | A1 | 10/2015 | Buellesfeld et al. |

FOREIGN PATENT DOCUMENTS

| | | | |
|---|---|---|---|
| CN | 101090874 | | 12/2007 |
| CN | 102414133 | | 4/2012 |
| CN | 102432158 | A | 5/2012 |
| EP | 0819655 | B1 | 12/1999 |
| GB | 827488 | A | 2/1960 |
| JP | H05116974 | A | 5/1993 |
| JP | 2006151736 | A | 6/2006 |
| JP | 2011093739 | A | 5/2011 |
| KR | 10-0906017 | B1 | 7/2009 |
| TW | I312769 | | 8/2009 |
| TW | 201228951 | | 7/2012 |
| WO | 2013070672 | | 5/2013 |

OTHER PUBLICATIONS

"Glass-Viscosity and Viscometric Fixed Points, Part 2: Determination of viscosity by rotation viscometers, (ISO 7884-2 : 1987)" DIN Deutsches Institut fur Normung e. V., Berlin, DIN ISO 7884-2, Feb. 1998, with English Translation, 25 pages.

"Glass-Viscosity and Viscometric Fixed Points, Part 3: Determination of viscosity by fibre elongation viscometer, (ISO 7884-3 : 1987)" DIN Deutsches Institut fur Normung e. V., Berlin, DIN ISO 7884-3, Feb. 1998, with English Translation, 22 pages.

"Glass-Viscosity and Viscometric Fixed Points, Part 4: Determination of viscosity by beam bending (ISO 7884-4 : 1987)" DIN Deutsches Institut fur Normung e. V., Berlin, DIN ISO 7884-4, Feb. 1998, with English Translation, 27 pages.

"Glass-Viscosity and Viscometric Fixed Points, Part 5: Determination of working point by sinking bar viscometer (ISO 7884-5 : 1987)" DIN Deutsches Institut fur Normung e. V., Berlin, DIN ISO 7884-5, Feb. 1998, with English Translation, 25 pages.

First Office Action dated Dec. 21, 2018 from corresponding Chinese Patent Application No. 201610972038.4, 15 pages.

* cited by examiner

METHOD FOR THE PRODUCTION OF GLASS COMPONENTS

CROSS REFERENCE TO RELATED APPLICATIONS

The present application is a continuation of U.S. patent application Ser. No. 14/675,301, filed on Mar. 31, 2015, which is in turn a continuation-in-part of U.S. patent application Ser. No. 14/265,765, filed on Apr. 30, 2014, now abandoned, which in turn claims the benefit of 35 U.S.C. § 119(a) of German Patent Application Nos. 10 2013 104 409.3, filed Apr. 30 2013, and 10 2014 100 750.6, filed Jan. 23, 2014, the entire contents of each of which are incorporated herein by reference.

BACKGROUND OF THE INVENTION

1. Field of the Invention

The present invention relates to a method for the production of glass components, a redrawing apparatus for conducting such a method as well as a glass component.

2. Description of Related Art

In principle, the redrawing of glasses is known, in particular a comprehensive state of the art about the redrawing of blanks and/or blanks with circular cross-section for the drawing of glass fibers exists.

During a redrawing method a glass piece is partially heated and drawn in the longitudinal direction with the help of suitable mechanical equipment. When the glass piece—the blank—is fed into a heating zone at a constant speed and when the heated glass is drawn with a constant speed, then this results in a reduction of the cross-section shape of the blank which depends on the ratio of the speeds. So, when for example tubular blanks are used, then again tubular products are prepared, but with smaller diameter. The cross-section shape of the products is similar to that of the blank, wherein for the most part it is even desirable to achieve a reproduction of the blank in a reduced scale of 1:1 by suitable measures (see EP 0 819 655 B1).

In a step of redrawing glasses normally an oblong blank is fixed on one end in a holder and heated at the other end in for example a muffle kiln. Once the glass has become deformable, it is drawn by the exertion of drawing force at the end of the blank being fixed in the holder. When during the process the blank is moved forward into the muffle, then with a suitable selection of the temperatures this results in a product with a smaller cross-section, but a similar geometry. For example, a blank with circular cross-section is drawn into a glass fiber. The selection of the speeds of drawing the product of for example a component and optionally moving forward the blank determines the reduction factor of the cross-section. Normally, the ratio of thickness to width of the cross-section of the blank remains constant. In the case of drawing glass fibers this is desired, because starting from a blank with circular cross-section a glass fiber having also a circular cross-section can be drawn.

It has been proven that it is difficult to redraw flat components, i.e. components having a ratio of width to thickness of the cross-section of for example 80:1. Only with blanks having a very high width it is possible to draw components with also a high width. So e.g. from a blank having a cross-section of 70 mm width and 10 mm thickness (B/D =7) a component having a cross-section of 7 mm width and 1 mm thickness (b/d =7) can be produced.

A component having a cross-section with a higher width and the same thickness is only possible, when a blank having a cross-section with a higher width or lower thickness is used. The use of a blank having a higher width often fails due to the impossible producibility, and the use of a blank having a lower thickness is increasingly inefficient, since the blank during redrawing has to be exchanged more often.

In U.S. Pat. No. 7,231,786 B2 is described, how plane glass panes can be produced by redrawing. For achieving a product with higher width, in this case grippers are used which draw the soft glass into the width direction, prior to expanding the glass into the longitudinal direction with the help of edge rollers.

In U.S. Pat. No. 3,635,687 A a redrawing method is described, in which by cooling of the edge region of the flat blank a change of the ratio of width to thickness (B/D) is achieved. But with this method a maximum increase of the ratio of width to thickness by a factor of 10.7 can be achieved.

In EP 0 819 655 B1 a method for forming glass is described. In this case in the forming step also redrawing can be used. But it is not described, how the ratio of width to thickness (B/D) is adjusted. Here after heating the glass is locally heated or cooled for manipulating the geometry.

However, the manipulations described in these references only result in a smaller change of the geometry of the blank in comparison to the final shape and/or to the shape of the drawn component. Furthermore, these methods are associated with relatively high effort. In particular in the case, when grippers or rolls should be used, a sophisticated redrawing apparatus is required which is susceptible to defects.

SUMMARY OF THE DISCLOSURE

Thus, the object of the present invention is the provision of an efficient method and apparatus for the production of glass components. Furthermore, a method should be provided which makes it possible to increase the ratio of width to thickness of the glass component (b/d) in comparison to the ratio of width to thickness of the blank (B/D). In particular, a method for the production of flat glass components should be provided, through which from a blank having a width B and a thickness D a flat glass component having a width b and a thickness d can be prepared, wherein the ratio b/d is much higher than the ratio B/D.

The object according to the present invention is solved by the embodiments which are described in the patent claims.

The method for redrawing glass according to the present invention serves for example for the production of flat glass components. It comprises the following steps:

- providing of a blank of glass having an average thickness D and an average width B,
- heating of a deformation zone of the blank,
- drawing the blank, till an average thickness d and an average width b is achieved, wherein the deformation zone is the part of the blank in which the blank has a thickness of between 0.95*D and 1.05*d and wherein the deformation zone has a height of at most 250 mm.

The method is characterized in that the deformation zone is very small in comparison to the state of the art. Preferably, the deformation zone (=meniscus) has a height of at most 15*D, preferably at most 12*D. Other preferred embodiments include a deformation zone having a height of at most 6*D, preferably at most 5*D and particularly preferably at most 4*D. In preferred embodiments of this invention the deformation zone has a height of at most 100 mm, more preferred at most 40 mm and most preferred at most 30 mm.

Preferably, the deformation zone extends over the whole width of the blank. “Height” of the deformation zone means the extent thereof in the direction into which the blank is drawn. The deformation zone (=meniscus) is the region in which the blank has a thickness of between 0.95*D and 1.05*d. Thus, it is a region in which the glass can be deformed. The thickness is smaller than the original thickness D, but the final thickness d is still not achieved. In the deformation zone for example a temperature $T_2$ may prevail, at which the glass of the blank has a viscosity $\eta_2$ of between $10^4$ dPas and $10^8$ dPas.

The width b of the drawn glass component increasingly decreases with increasing viscosity in the deformation zone. When in the case of softening for example the drawing speed is increased for achieving a target value of 100 μm for the thickness d of the glass component, the width b of the glass component in comparison to width B of the blank would considerably be decreased. Therefore, for obtaining a flat glass component with a high ratio b/d it is advantageous, when the glass of the blank in the deformation zone has a viscosity $\eta_2$ which is lower than the viscosity of the respective glass at the softening point (EW). Therefore, the glass of the blank in the deformation zone has preferably a viscosity $\eta_2$ of at most $<10^{7.6}$ dPas, further preferably at most $10^{7.5}$ dPas, even further preferably at most $10^{7.0}$ dPas, exceptionally preferably at most $10^{6.5}$ dPas. Furthermore, a viscosity $\eta_2$ which is lower than the viscosity of the respective glass at the softening point is also advantageous, because the drawing force being required for drawing the glass increasingly increases with increasing viscosity. Thus, a lower viscosity is also associated with a lower required drawing force.

However, the viscosity $\eta_2$ of the glass of the blank in the deformation zone should also not be too low, since otherwise a uniform drawing of the glass becomes more difficult. Preferably, the glass of the blank in the deformation zone has a viscosity $\eta_2$ of at least $10^{4.0}$ dPas, further preferably at least $10^{4.5}$ dPas, even further preferably at least $10^{5.0}$ dPas, exceptionally preferably at least $10^{5.8}$ dPas.

The invention described here may be combined with a cooling of the edge region of the blank in analogy with U.S. Pat. No. 3,635,687 A, to achieve an even higher width and/or a better thickness distribution. Also a higher edge temperature is possible for achieving a better thickness distribution.

The deformation zone is the part of the blank with a thickness of 0.95*D up to 1.05*d. Preferably, this is the part of the blank which during said method at a certain time point has temperature $T_2$. At this temperature the viscosity of the glass of the blank is in a range which allows deformation of the glass.

The blank has an upper end and a lower end. The deformation zone is located between the upper and the lower ends. Beyond the deformation zone the temperature of the blank is preferably lower than $T_2$. Because of that the deformation of the blank substantially only occurs in the region of the deformation zone. Above and below this region preferably the thickness and also the width remain substantially constant. For the sake of convenience throughout this description the term “blank” is used, when the glass is processed in this method, only after the end of the final process step according to the present invention the product is called “glass component”.

Preferably, the increase of the ratio of width to thickness of the blank is substantially achieved by the measure that the thickness d of the glass component produced is substantially lower than the thickness D of the blank. Preferably, the thickness d is at most D/10, further preferably at most D/30 and particularly preferably at most D/75. In other preferred embodiments, the thickness d is at most D/100 or even at most D/200. Then, the glass component has preferably a thickness d of lower than 10 mm, further preferably lower than 1 mm, more preferably lower than 100 μm, further preferably lower than 50 μm and particularly preferably lower than 30 μm or even lower than 15 μm or lower than 5 μm. With the present invention it is possible, to produce such thin glass components in high quality and with relatively large surface areas.

Preferably, width b of the glass component produced in relation to width B of the blank is hardly decreased. This means that the ratio B/b is preferably at most 2, further preferably at most 1.6 and particularly preferably at most 1.25.

The method can be conducted in a redrawing apparatus which is also part of the present invention. For the purpose of heating the blank can be inserted into the redrawing apparatus. Preferably, the redrawing apparatus comprises a holder in which one end of the blank can be fixed. The holder is preferably located in an upper section of the redrawing apparatus. Then, the blank is fixed with its upper end in the holder.

The redrawing apparatus comprises at least one heating facility. The heating facility is preferably arranged in a central region of the redrawing apparatus. The heating facility may preferably be an electric resistance heater, a burner arrangement, a radiation heater, a laser with or without laser scanner or a combination thereof. The heating facility is preferably designed such that it can heat the blank being disposed in a deformation region in such a manner that the deformation zone of the blank is heated to temperature $T_2$. The deformation region is a region which is preferably located inside the redrawing apparatus. The heating facility increases the temperature of the deformation region and/or a part of the blank to a temperature which is so high that a blank which is disposed in the deformation region is heated within its deformation zone to temperature $T_2$. When a heating facility is used which is suitable for targeted heating of only a part of the blank, such as a laser, then the temperature in the deformation region is hardly increased.

The deformation region has preferably a height which results in a deformation zone in the blank having a height of at most 15*D, more preferably at most 12*D. Other preferred embodiments include deformation zones having a height of at most 100 mm (in particular at most 6*D), preferably at most 40 mm (in particular at most 5*D) and particularly preferably at most 30 mm (in particular at most 4*D). Therefore, according to the heating manner and the blank dimensions the deformation region can be designed in different lengths.

The heating facility increases the temperature in the deformation region and/or a part of the blank which preferably has only such an extent that in the blank the deformation zone in accordance with the present invention is heated to temperature $T_2$. The parts of the blank which are above and below the deformation zone have preferably a temperature which is lower than $T_2$. According to the present invention, this is preferably achieved by a heating facility comprising one or more baffles which shadow those parts of the blank which are beyond the deformation region. Alternatively or additionally a heating facility allowing a focused heating of the blank in the deformation region, such as for example a laser or a laser scanner, can be used. A further alternative embodiment relates to a heating facility with only low height which is disposed near to the deformation zone so that substantially the heat does not spread into regions beyond the deformation region.

The heating facility may be a radiation heater, wherein the heating effect of which is focused and/or limited to the deformation region by suitable radiation guiding and/or restricting means. For example, a KIR (short-wave IR) heater may be used, wherein by shadowing a deformation region is created which is very small according to the present invention. Also cooled (with gas, water or air) baffles may be used. A further heating facility which may be used is a laser. In this case for the radiation guidance of the laser a laser scanner may be used.

The apparatus may comprise a cooling facility being preferably arranged in a lower region of the redrawing apparatus, in particular directly below the heating facility. With this facility, directly after the deforming step, the viscosity of the glass is preferably changed to values of $>10^9$ dPas so that no appreciable deformation takes place any longer. This cooling is preferably conducted such that it results in a viscosity change rate of at least $10^6$ dPas/s. Depending on the glass of the blank this corresponds for example to temperatures T3 in a range of 400 to 1000° C.

The method according to the present invention preferably comprises the further step of cooling the blank after leaving the deformation region.

The further cooling of the blank to viscosities $>10^9$ dPas may be achieved by cooling at ambient temperature (e.g. 10 to 25° C.). But the blank may also be cooled in an active manner in a fluid, such as for example in a gas stream. It is particularly preferable, when the product is cooled so slowly in a cooling region which follows the deformation region that the residual tensions at least allow subsequent cross-cutting as well as the removal of sheet edges without any introversive cracks.

Preferably, the deformation region is arranged such and/or the heating facility is designed such that the deformation zone is created within the blank. The deformation zone is that part of the blank which during the process has a thickness of 0.95*D to 1.05*d. By heating of the deformation zone of the blank the viscosity of the glass at the respective site decreases so much that the blank can be drawn. This means that the blank becomes longer. By the drawing step the thickness D of the blank becomes lower. Since the blank is preferably fixed with the upper end in a holder which preferable is located in an upper region of the redrawing apparatus, the drawing of the blank may be effected by exposure of gravitation. But in preferable embodiments the redrawing apparatus comprises a drawing facility which preferably exerts drawing forces at a part of the blank below the deformation region, in particular at the lower end of the blank.

The drawing facility is preferably arranged in a lower region of the redrawing apparatus. In this case the drawing facility may be designed such that is comprises rolls acting on opposing sides of the blank. The blank may detachably be mounted with a lower end at a second holder. In particular, the second holder is a component of the drawing facility. At the second holder for example a weight may be mounted which then draws the blank into the longitudinal direction. Alternative means for drawing the blank are also within the scope of this invention. Preferably, the drawing force used is lower than 350 N/400 mm blank width (B), further preferably lower than 300 N/400 mm blank width, even further preferably lower than 100 N/400 mm blank width, exceptionally preferably lower than 50 N/400 mm blank width. Preferably, the drawing force is higher than 1 N/400 mm blank width, further preferably higher than 5 N/400 mm blank width, even further preferably higher than 10 N/400 mm blank width, exceptionally preferably higher than 20 N/400 mm blank width.

In a preferable embodiment the blank is fed into the direction of the deformation zone so that the method can be conducted in a continuous manner. For this purpose the redrawing apparatus preferably comprises a feeding facility which is suitable for moving the blank into the deformation region. So the redrawing apparatus can be used in continuous operation. The feeding facility preferably moves the blank into the deformation region with a speed $v_N$ which is lower than the speed $v_Z$ with which the blank is drawn. So the blank is drawn into the longitudinal direction. The ratio of $v_N$ to $v_Z$ is in particular <1, preferably at most 0.8, further preferably at most 0.4 and particularly preferably at most 0.1. The difference of these two speeds determines the extent of the reduction of the width and the thickness of the blank.

Prior to heating the blank is preferably preheated. For this purpose the redrawing apparatus preferably comprises a preheating facility in which the blank may be heated to a temperature $T_1$. The preheating facility is preferably arranged in an upper region of the redrawing apparatus. Temperature $T_1$ corresponds for example to a viscosity $\eta_1$ of $10^{10}$ to $10^{14}$ dPas. Thus, the blank is preferably preheated, before it enters the deformation region. So a faster movement through the deformation region becomes possible, since the time which is necessary for achieving temperature $T_2$ is shorter. With the preheating facility it can also be avoided that glasses with high temperature expansion coefficients break due to temperature gradients which are too high.

In preferable embodiments the deformation zone is heated to a temperature $T_2$ which corresponds to a viscosity of the glass of the blank of $10^{5.8}$ to $10^{7.6}$ dPas, in particular $10^{5.8}$ to $<10^{7.6}$ dPas. The viscosity of a glass depends on the temperature. At each temperature the glass has a certain viscosity. The temperature $T_2$ which is necessary for achieving the desired viscosity $\eta_2$ in the deformation zone depends on the glass. The viscosity of a glass will be determined according to DIN ISO 7884-2, -3, -4, -5.

The blank preferably consists of a glass which is selected from fluorophosphate glasses, phosphate glasses, soda-lime glasses, lead glasses, silicate glasses, aluminosilicate glasses and borosilicate glasses. The glass used may be a technical glass, in particular technical flat glass, or an optical glass.

Preferred technical glasses are soda-lime glasses and borosilicate glasses. In preferable embodiments the glasses are display glasses or thin glasses for barrier layers in plastic laminates.

Preferred optical glasses are phosphate glasses and fluorophosphate glasses. Phosphate glasses are optical glasses containing $P_2O_5$ as glass former. Then, $P_2O_5$ is the main component of the glass. When a part of the phosphate in a phosphate glass is replaced by fluorine, then fluorophosphate glasses are obtained. For the synthesis of fluorophosphate glasses instead of oxidic compounds such as for example $Na_2O$ the respective fluorides such as NaF are added to the glass mixture.

According to the present invention preferably a flat blank is used, wherein according to the present invention a “flat blank” means that the width B of the blank is higher than the thickness D thereof. Preferably, the ratio of width to thickness of the blank (B/D) is at least 5, more preferably at least 7.

Preferably, the blank has a thickness D of at least 0.05 mm, more preferably at least 1 mm. The thickness is preferably at most 40 mm, more preferably at most 30 mm.

The width B of the blank is preferably at least 50 mm, more preferably at least 100 mm, most preferably at least 300 mm.

The length of the blank L is preferably at least 500 mm, more preferably at least 1000 mm. Generally it is true that the method can be conducted in a more efficient manner, when the blank is longer. So also still longer blanks may be considered and may be advantageous. Also an execution of a method may be considered in which the blank is fed in a continuous manner or the blank is uncoiled from a roll. Furthermore, preferably the following is true: L>B.

The method according to the present invention may also be conducted with a blank which is coiled on a first roll. In this case the blank is also fixed in an upper region of the redrawing apparatus, but in such a manner that the blank can be uncoiled from the roll. The free end of the blank is then drawn by means of the drawing facility. The drawing facility then draws the blank through the deformation region in a preferably continuous and constant manner so that within the blank a deformation zone according to the present invention is formed. The glass component so prepared after passing the redrawing apparatus is preferably coiled onto a second roll.

The blank may comprise or may not comprise a sheet edge (a thickened boundary region). By the provision of the blank on a roll and/or the coiling of the flat glass component onto a roll the method in total can be conducted more efficiently, since the blanks have not to be inserted singly into the apparatus in a laborious manner.

Finally, for example by cutting, the obtained glass component may be separated into single pieces. Furthermore, also the optionally somewhat thickened boundary regions (sheet edges) of the glass component may be cut off. If necessary, the glass component may also be polished and/or coated.

With the method according to the present invention glass components with a very large useable surface area of glass can be obtained. This means that the part of the glass component with the required quality is very large. In the method of this invention the part of the surface area of sheet edges which optionally have to be removed before the use is small. Preferably, the glass components have a ratio of thickness to width of 1:2 to 1:250,000. In more preferred embodiments, this ratio is from 1:200 to 1:200,000; further preferred this ratio is from 1:2,500to 1:150,000; other preferred ranges of this ratio include 1:3,000 to 1:100,000 and 1:5,000 to 1:20,000. Of course, the useable surface area of the glass is higher when this ratio is small, i.e. when the obtained glass component is wider. In the prior art such small ratios are often not achieved because the processes used do not provide for an increase of b/d in relation to B/D (see above). In other words, in order to achieve such a preferred ratio of thickness to width the thickness must be decreased to a much greater extent than the width.

Preferably, the blank can be classified in a striae class of at most C. The striae class is a result of the optical path difference. For striae class C or better the optical path difference through a flat plate has to be <30 nm.

According to the present invention is also a glass component which is obtainable by the method according to the present invention. The glass component comprises at least one, in particular two fire-polished surfaces. Fire-polished surfaces are very smooth, i.e. their roughness is very low. In the case of fire-polishing in contrast to mechanical polishing a surface will not be abraded, but the material to be polished is heated to such a high temperature that it flows and thus becomes smooth. Therefore the costs for the production of a smooth surface by fire-polishing are substantially lower than for the production of a highly smooth mechanically polished surface.

With the method according to the present invention glass components with at least one fire-polished surface are obtained. Referred to the glass component according to the present invention, the term "surfaces" means the upper and/or lower sides, thus both faces which in comparison to the residual faces are the largest.

The fire-polished surface(s) of the glass components of this invention preferably have a root mean square roughness ($R_q$ or also RMS) of at most 5 nm, preferably at most 3 nm and particularly preferably at most 1 nm. The depth of roughness $R_t$ of the thin glasses is preferably at most 6 nm, further preferably at most 4 nm and particularly preferably at most 2 nm. The depth of roughness will be determined according to DIN EN ISO 4287.

In the case of mechanically polished surfaces the roughness values are worse. Furthermore, in the case of mechanically polished surfaces with the help of an atomic force microscope (AFM) polishing traces can be observed. In addition, also with the help of an AFM residues of the mechanic polishing agent, such as diamond powder, iron oxide and/or $CeO_2$, can be observed. Since mechanically polished surfaces have to be cleaned after a polishing step, leaching of certain ions at the surface of the glass occurs. This depletion of certain ions can be detected with the help of secondary ion mass spectrometry (ToF-SIMS). Such ions are for example Ca, Zn, Ba and alkali metals.

In the following the invention should be explained by means of the following figures and embodiment examples.

DETAILED DESCRIPTION OF THE DISCLOSURE

Figure 1:
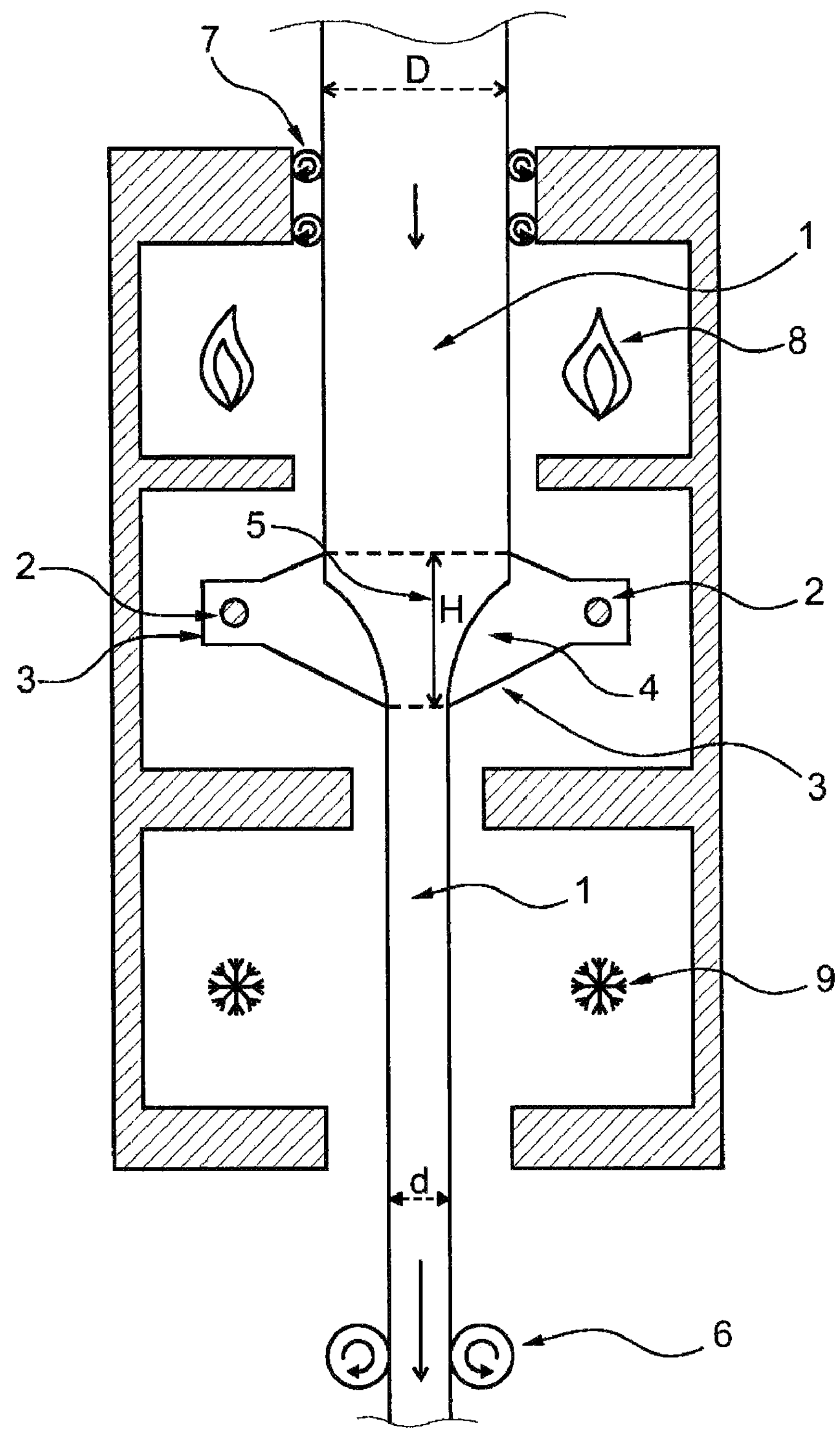
FIG. 1 shows in a schematic manner a side view of an exemplary embodiment of a redrawing apparatus according to the present invention.

FIG. 1 shows in a side view the schematic structure of an exemplary embodiment of a redrawing apparatus according to the present invention. In the redrawing apparatus a blank 1 is moved top down through the apparatus. The redrawing apparatus comprises two heating facilities 2 being arranged in a center region of the apparatus. In this embodiment the heating facilities are shielded by baffles 3 in such a manner that a deformation region 4 is formed. A part of blank 1 which is disposed in deformation region 4 is heated such that it reaches temperature $T_2$. This part of the blank is the deformation zone 5 having height H. Blank 1 is drawn down with the help of a drawing facility 6 which here is realized in the form of two driven rolls. As a result that the feeding facility 7, here also designed in the form of rolls, feeds blank 1 in a speed which is lower than the speed of the drawing facility 6, blank 1 is deformed in deforming region 4. Because of that blank 1 becomes thinner; the thickness after the deforming step d is smaller than that prior the deforming step D. Prior to feeding blank 1 into deformation region 4 it is preheated to temperature $T_1$ with the help of preheating facility 8, here symbolized by a burner flame. After passing the deformation region 4 blank 1 is fed into a cooling facility 9, here symbolized by an ice crystal.

Figure 2:
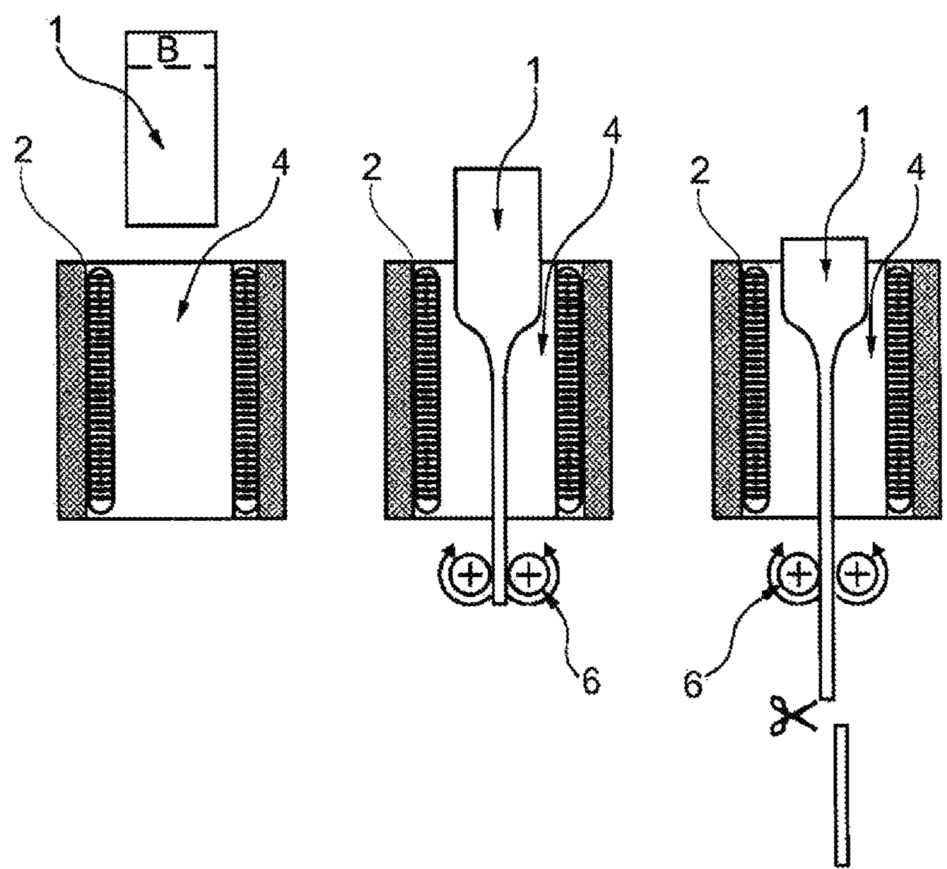
FIG. 2 shows the schematic operating sequence of a method according to prior art.

FIG. 2 shows the schematic operating sequence of a method according to prior art. A difference to FIG. 1 is that in this case the change of width B of the blank is shown. Blank 1 is moved into a deformation region 4. Deformation region 4 is heated with a heating facility 2—here a resistance heater. Blank 1 is heated such that in the glass a deformation zone is formed, where the glass has low viscosity. But this deformation zone is much larger than the deformation zone according to the present invention due to the lack of any limitation and the height of heating facility 2. So a particularly distinct reduction of the width of blank 1 results. Also a drawing facility 6 is shown which draws blank 1 into the longitudinal direction.

Figure 3:
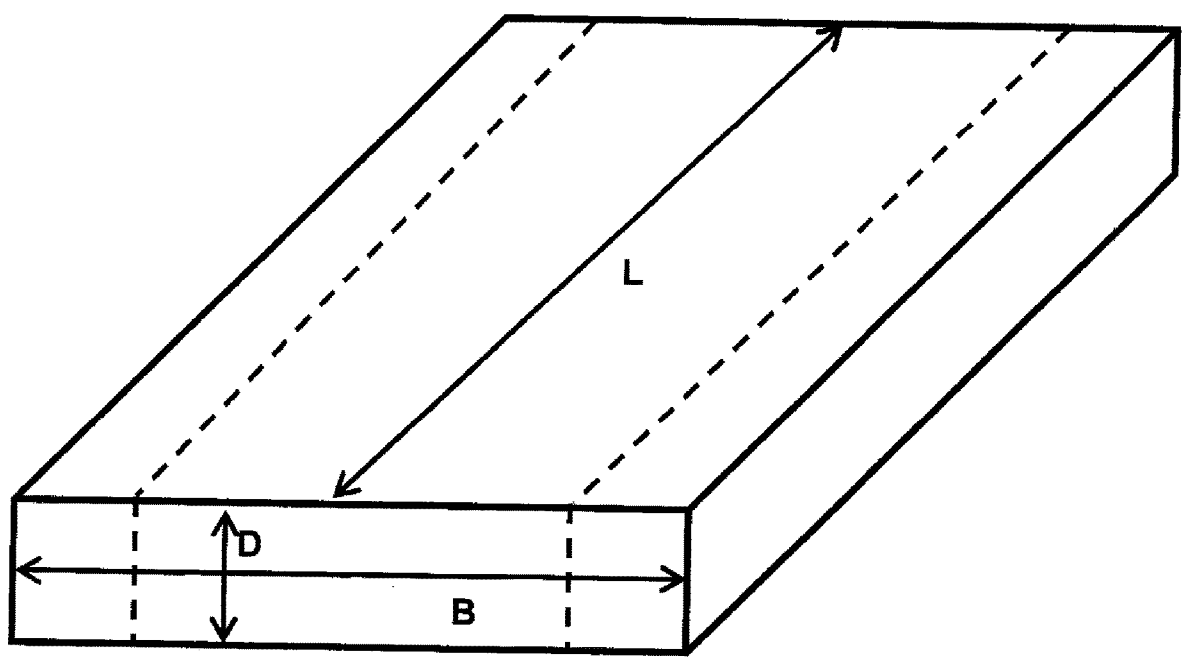
FIG. 3 shows in a schematic manner a blank.

FIG. 3 shows in a schematic manner a blank with length L, thickness D and width B.

Figure 4:
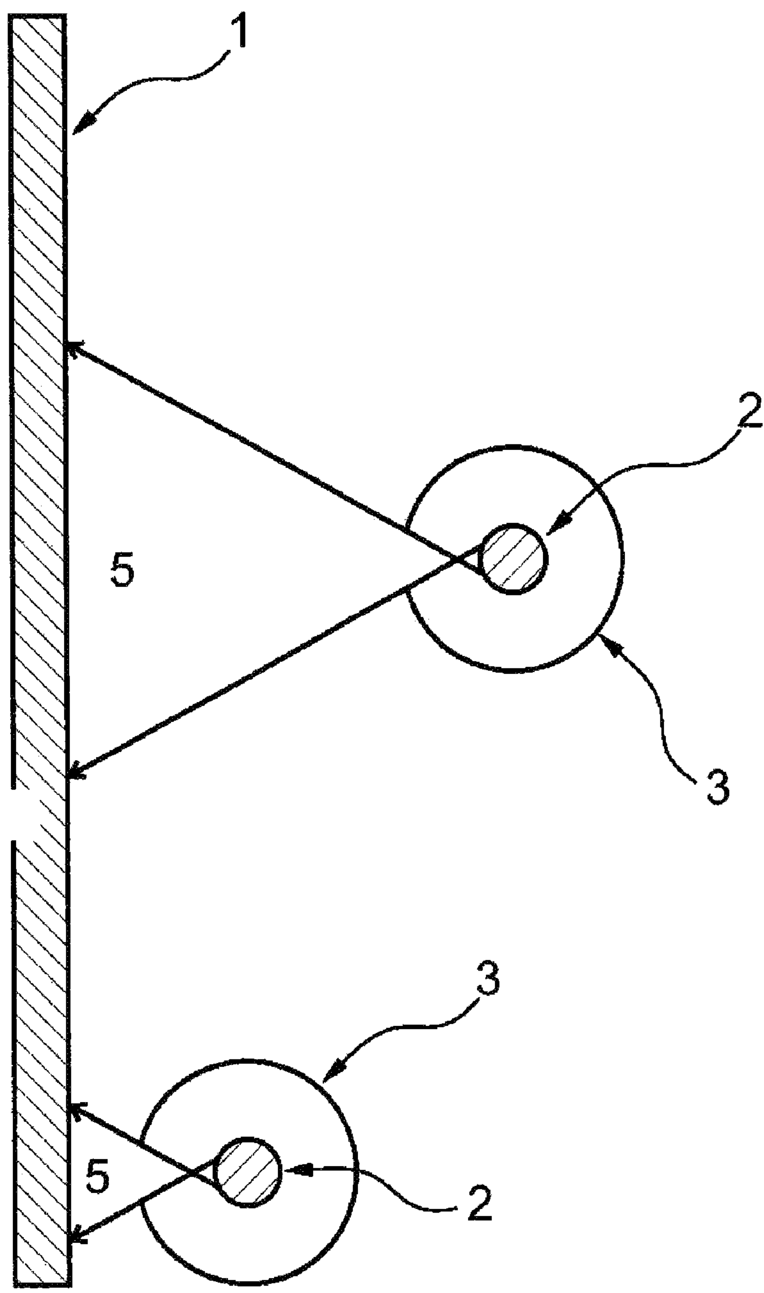
FIG. 4 shows in a schematic manner a mode of action of an optional radiation heater.

FIG. 4 shows in a schematic manner the mode of action of an optional radiation heater which may be used as a heating facility 2. Dependent on its distance to blank 1 the height of deformation zone 5 is different. In this figure it is also shown, how by means of shadowing facility/baffle 3 the deformation zone can be limited to obtain a deformation zone 5 with a height which is as low as possible. Thus both, the distance and also the design of the heating facility 2 may serve for the adjustment of the height of deformation zone 5.

Figure 5:
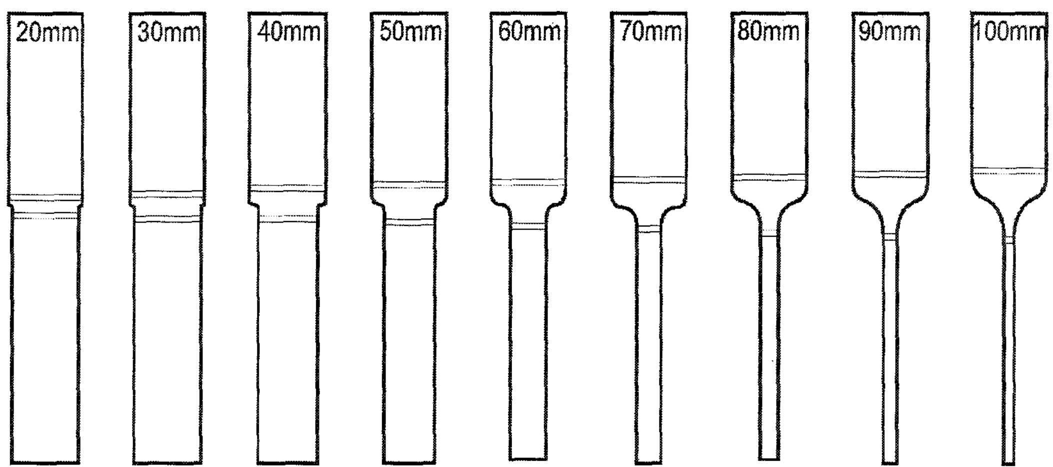
FIG. 5 shows the dependency of the widths of a glass product on the height of the deformation zone in a redrawing process.

FIG. 5 shows the dependency of the widths of a glass product on the height of the deformation zone in a redrawing process. It can be seen that a deformation zone with a lower height results in a reduction of the decrease of the width of the blank.

Figure 6:
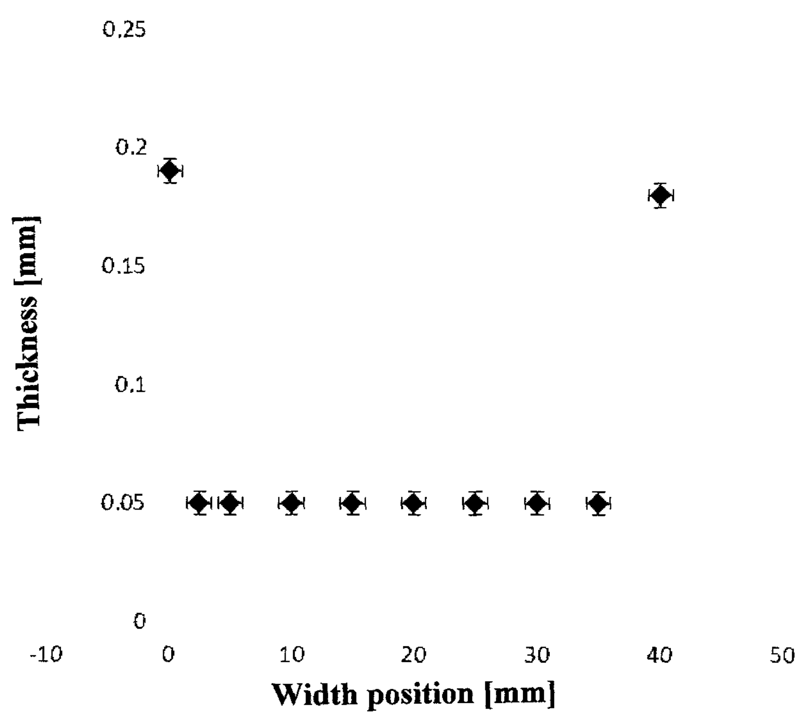
FIG. 6 shows the distribution of thickness d of a flat glass product across width b of an example (example 3).

FIG. 6 shows the distribution of thickness d of a flat glass product across width b of the product of example 3. Here can be seen that the sheet edges at the rims of the glass product are relatively small. The part with a homogenous low thickness can be used for the application of the glass product, but the sheet edges have to be removed. The use of the method according to the present invention results in a particularly high rate of yield.

Figure 7:
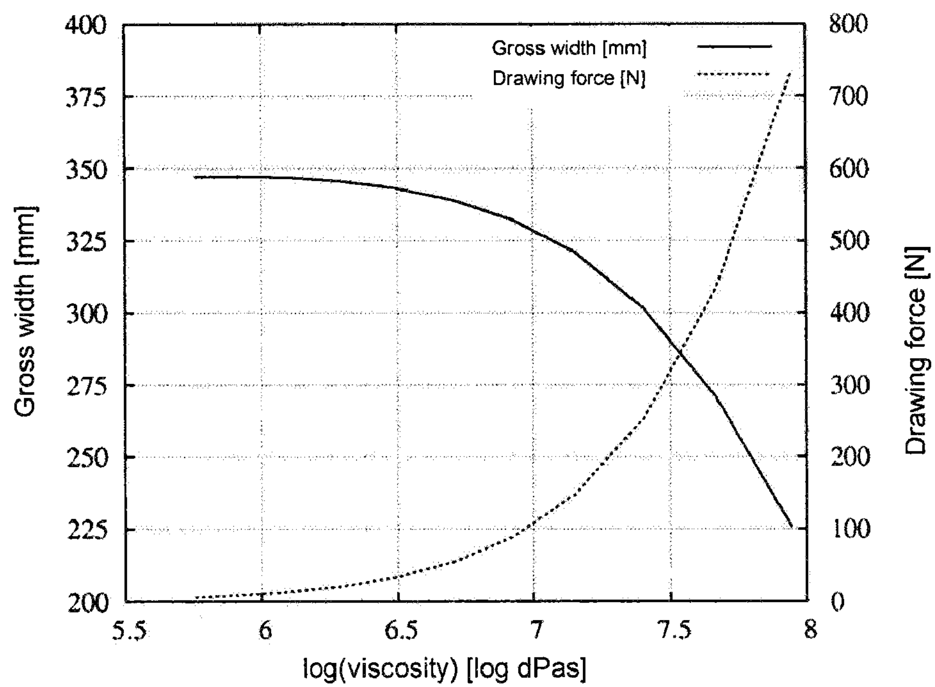
FIG. 7 shows in an exemplary manner average width b (gross width) of the drawn glass component and the drawing force.

FIG. 7 shows in an exemplary manner average width b (gross width) of the drawn glass component and the drawing force which is required for drawing, each in dependency on the viscosity of the glass of the blank in the deformation zone, in the case of a blank having a thickness of 4 mm and a width of 400 mm which is fed into a muffle with a height of 40 mm with a speed of 5 mm/min. The glass is drawn with 200 mm/min. It can be clearly seen that the required drawing force increasingly increases with increasing viscosity. Furthermore it can be seen that average width b of the product obtained increasingly decreases with increasing viscosity.

Figure 8:
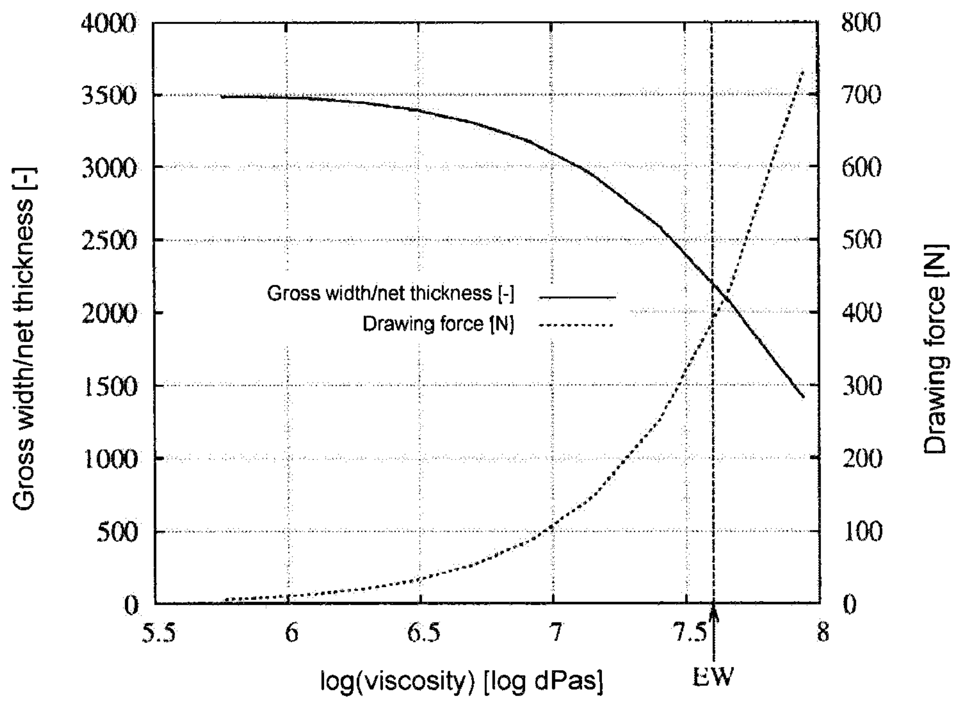
FIG. 8 shows a plot of the ratio of average width b (gross width) to average thickness d (net thickness) of the drawn glass component and the drawing force which is necessary for drawing, each in dependency on the viscosity of the glass of the blank.

FIG. 8 shows in an exemplary manner the ratio of average width b (gross width) to average thickness d (net thickness) of the drawn glass component and the drawing force which is necessary for drawing, each in dependency on the viscosity of the glass of the blank in the deformation zone, in the case of a blank having a thickness of 4 mm and a width of 400 mm which is fed into the muffle with a height of 40 mm with a speed of 5 mm/min. The glass is drawn with 200 mm/min. It can be seen that the ratio b/d of the product obtained increasingly decreases with increasing viscosity. In comparison to the decrease of average width b with increasing viscosity shown in FIG. 7 the ratio b/d decreases in a relatively higher extent with increasing viscosity.

EXAMPLES

Example 1

Drawing of Optical Glass

Here the optical glass (fluorophosphate glass) is cast into a bar form having dimensions of e.g. B=120 mm and D=14 mm. Then this bar is inserted into the redrawing apparatus and heated in a preheating zone to a temperature which corresponds to the glass-transition point (ca. $10^{13}$ dPas). By moving the blank downwards into a deformation region with a height of 40 mm and a temperature which at least corresponds to a viscosity of $<10^{7.6}$ dPas and in the maximum a viscosity of ca. $10^4$ dPas. The leaving glass is guided through a cooling zone and fixed in a drawing facility and drawn faster than the blank is fed. So this results in a ribbon of glass having a width of 100 mm and an average thickness of 0.3 mm.

Example 2

Drawing of Flat Glass

As a blank a flat glass (Borofloat®) having a width of 300 and a thickness of 10 mm is provided. After passing a preheating zone (ca. Tg) this blank is moved into the deformation zone. This zone is heated over the whole width and a height of 20 mm to a minimum temperature which corresponds to a viscosity of $10^4$ dPas to $<10^{7.6}$ dPas. After passing a cooling zone the leaving glass is fixed in a drawing facility. By a suitable selection of the speed of the blank and the speed of the product an average thickness of at most 100 μm is adjusted and the product is coiled onto a cylinder. So this results in a product having a width of at least 250 mm.

Example 3

Drawing of Flat Glass

A blank made of flat glass (Borofloat®) having a width of 50 mm and a thickness of 1.1 mm is provided. After passing a preheating zone (ca. Tg) this blank is moved into the deformation zone. In the deformation zone the glass is heated over the whole width and a height of 3 mm to a temperature which corresponds to a viscosity of ca. $10^7$ dPas. After passing a cooling zone on the leaving glass a weight is attached (drawing facility). By a suitable selection of the speed of the blank and the size of the weight an average thickness of about 50 μm is adjusted. So this results in a product having a width of at least 40 mm.

TABLE 1

| Examples and comparative examples | | | |
|---|---|---|---|
| | U.S. Pat. No. 3,635,687 without edge cooler | U.S. Pat. No. 3,635,687 with edge cooler | According to the present invention |
| Length of deformation region [mm] | 508 | 508 | 30 |
| Width of blank B [mm] | 508.0 | 508.0 | 120.0 |
| Thickness of blank D [mm] | 6.4 | 6.4 | 14.0 |
| Ratio B/D | 80.0 | 80.0 | 8.6 |
| Width of component b [mm] | 19.1 | 61.4 | 100.0 |
| Average thickness of component d [mm] | 0.1 | 0.1 | 0.3 |
| Ratio b/d | 250.0 | 853.3 | 333.3 |
| (Ratio b/d)/(ratio B/D) | 3.1 | 10.7 | 38.9 |

LIST OF REFERENCE SIGNS

1 blank
2 heating facility
3 baffle
4 deformation region
5 deformation zone
6 drawing facility
7 feeding facility
8 preheating facility
9 cooling facility

The invention claimed is:

1. A method for redrawing of glass, comprising the steps of:

providing a blank of glass having an average thickness D and an average width B, wherein the width B of the blank is higher than the thickness D thereof;

heating a deformation zone of the blank; and drawing of the blank to an average thickness d and an average width b, wherein the deformation zone is the part of the blank in which the blank has a thickness of between 0.95*D and 1.05*d and wherein the deformation zone has a height of at most 250 mm, and wherein the ratio B/b is at most 2.

2. The method according to claim 1, wherein the deformation zone has a height of at most 100 mm.

3. The method according to claim 2, wherein the glass of the blank has a viscosity $\eta_2$ of at most $<10^{7.6}$ dPas in the deformation zone.

4. The method according to claim 1, wherein the glass of the blank has a viscosity $\eta_2$ of at most $<10^{7.6}$ dPas in the deformation zone.

5. The method according to claim 1, wherein the glass is a technical glass or an optical glass.

6. The method according to claim 1, wherein the method further comprises the step of cooling the blank after leaving the deformation region such that the cooling results in a viscosity change of at least $10^6$ dPas/s.

7. The method according to claim 1, wherein the deformation zone of the blank is heated in a redrawing apparatus which at least comprises a heating facility being selected from the group consisting of a resistance heater, a burner arrangement, a radiation heater, a laser, and combinations thereof.

8. The method according to claim 1, wherein the ratio of width B to thickness D of the blank is at least 5.

9. The method according to claim 1, wherein the thickness d is at most D/10.

10. The method according to claim 1, wherein the blank is drawn in a region below the deformation zone with a drawing facility.

11. The method according to claim 1, wherein the blank is fed from a region above deformation zone into the direction of deformation zone.

* * * * *